United States Patent
Bourret

(10) Patent No.: US 10,701,244 B2
(45) Date of Patent: Jun. 30, 2020

(54) RECOLORIZATION OF INFRARED IMAGE STREAMS

(71) Applicant: Microsoft Technology Licensing, LLC, Redmond, WA (US)

(72) Inventor: Louis-Philippe Bourret, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 422 days.

(21) Appl. No.: 15/282,993

(22) Filed: Sep. 30, 2016

(65) Prior Publication Data

US 2018/0097972 A1    Apr. 5, 2018

(51) Int. Cl.
*H04N 1/60*   (2006.01)
*H04N 5/265*   (2006.01)
(Continued)

(52) U.S. Cl.
CPC ....... *H04N 1/6008* (2013.01); *G06K 9/00577* (2013.01); *G06K 9/00624* (2013.01); *G06K 9/2018* (2013.01); *G06K 9/4652* (2013.01); *G06K 9/6201* (2013.01); *G06K 9/6267* (2013.01); *G06T 5/001* (2013.01); *G06T 5/50* (2013.01); *G06T 7/33* (2017.01); *G06T 11/001* (2013.01); *H04N 5/265* (2013.01);
(Continued)

(58) Field of Classification Search
CPC ...... H04N 1/6008; H04N 5/332; H04N 5/265; H04N 5/33; G06T 7/00; G06T 5/001; G06T 2207/10024; G06K 9/00577
See application file for complete search history.

(56) References Cited

U.S. PATENT DOCUMENTS 4,751,571 A  *  6/1988  Lillquist .................. G01J 5/48
                                                  250/330
6,792,136 B1 *  9/2004  Niesen .................. G06T 11/001
                                                  250/330
(Continued)

OTHER PUBLICATIONS

Ribaric, et al., "A knowledge-based system for the non-destructive diagnostics of facade isolation using the information fusion of visual and IR images", In International Journal of Expert Systems with Applications, vol. 36, No. 2P2, Mar. 2009, pp. 3812-3823.

(Continued)

*Primary Examiner* — Jayanti K Patel
*Assistant Examiner* — Stefan Gadomski
(74) *Attorney, Agent, or Firm* — Arent Fox LLP

(57) ABSTRACT

Methods and devices for colorizing an infrared image stream may include receiving an infrared (IR) image stream of a scene. The methods and devices may include detecting at least one object in the IR image stream and receiving, from a red green blue (RGB) knowledge base, a RGB texture corresponding to the at least one object detected in the IR image stream. The methods and devices may include processing the RGB texture by matching coordinates in the RGB texture with corresponding coordinates in the at least one object to produce a colorized IR image stream. The methods and devices may include transmitting the colorized IR image stream of the scene wherein the at least one object is displayed in color based on the processing.

17 Claims, 4 Drawing Sheets

(51) Int. Cl.

| | | |
|---|---|---|
| *H04N 5/33* | (2006.01) | |
| *G06K 9/20* | (2006.01) | |
| *G06K 9/46* | (2006.01) | |
| *G06T 11/00* | (2006.01) | |
| *G06T 7/33* | (2017.01) | |
| *G06T 5/50* | (2006.01) | |
| *G06K 9/00* | (2006.01) | |
| *G06K 9/62* | (2006.01) | |
| *G06T 5/00* | (2006.01) | |

(52) U.S. Cl.
CPC ............... *H04N 5/33* (2013.01); *H04N 5/332* (2013.01); *G06K 9/00234* (2013.01); *G06K 9/00248* (2013.01); *G06T 2207/10024* (2013.01); *G06T 2207/10048* (2013.01)

(56) References Cited

U.S. PATENT DOCUMENTS

| | | | |
|---|---|---|---|
| 7,560,679 B1 | 7/2009 | Gutierrez | |
| 9,092,657 B2 | 7/2015 | Ahmad et al. | |
| 9,094,661 B2 | 7/2015 | Venkataraman et al. | |
| 9,225,916 B2 | 12/2015 | Friel et al. | |
| 9,235,899 B1 | 1/2016 | Kirmani et al. | |
| 9,336,434 B2* | 5/2016 | Thiebot | G06K 9/00288 |
| 9,465,444 B1* | 10/2016 | Ramaswamy | G06F 3/017 |
| 2002/0048411 A1* | 4/2002 | Takayama | G06K 9/40 382/275 |
| 2005/0078121 A1* | 4/2005 | Turner | G09B 9/301 345/581 |
| 2006/0249679 A1 | 11/2006 | Johnson et al. | |
| 2006/0266942 A1* | 11/2006 | Ikeda | H04N 5/23238 250/334 |
| 2007/0146512 A1* | 6/2007 | Suzuki | H04N 9/083 348/272 |
| 2010/0045809 A1* | 2/2010 | Packard | H04N 5/2258 348/222.1 |
| 2010/0314543 A1* | 12/2010 | Lee | G01J 3/02 250/330 |
| 2010/0328475 A1 | 12/2010 | Thomas et al. | |
| 2011/0080487 A1* | 4/2011 | Venkataraman | H04N 5/2253 348/218.1 |
| 2011/0122308 A1* | 5/2011 | Duparre | H01L 27/14621 348/340 |
| 2011/0169911 A1 | 7/2011 | Gabura | |
| 2011/0199482 A1* | 8/2011 | Morgan | H04N 5/2251 348/143 |
| 2011/0225538 A1* | 9/2011 | Oyagi | G06F 1/1692 715/781 |
| 2011/0293179 A1 | 12/2011 | Dikmen et al. | |
| 2012/0105630 A1* | 5/2012 | Cao | G08B 13/19608 348/143 |
| 2012/0147194 A1* | 6/2012 | Wang | H04N 5/33 348/164 |
| 2012/0262577 A1* | 10/2012 | Wang | G06K 9/00369 348/148 |
| 2013/0076927 A1* | 3/2013 | Lee | H04N 5/2351 348/216.1 |
| 2013/0229513 A1* | 9/2013 | Ichitani | G02B 27/1066 348/135 |
| 2013/0258044 A1 | 10/2013 | Betts-Lacroix | |
| 2014/0168378 A1* | 6/2014 | Hall | H04N 13/246 348/47 |
| 2014/0240512 A1* | 8/2014 | Hogasten | H04N 5/2257 348/164 |
| 2014/0253735 A1* | 9/2014 | Fox | H04N 5/2252 348/164 |
| 2014/0267361 A1* | 9/2014 | McClanahan | G09G 5/02 345/590 |
| 2015/0077587 A1* | 3/2015 | Kino | G09G 5/026 348/223.1 |
| 2015/0146009 A1* | 5/2015 | Kostrzewa | H04N 5/2256 348/164 |
| 2015/0172635 A1* | 6/2015 | Kimmel | H04N 13/246 348/51 |
| 2015/0187144 A1* | 7/2015 | Roth | G06T 19/006 345/633 |
| 2015/0281593 A1 | 10/2015 | Slbay et al. | |
| 2015/0281599 A1* | 10/2015 | Slaby | H04N 5/265 348/164 |
| 2015/0304638 A1 | 10/2015 | Cho et al. | |
| 2015/0319378 A1* | 11/2015 | Hoelter | H04N 5/3532 348/164 |
| 2015/0319379 A1* | 11/2015 | Nussmeier | H04N 5/33 348/165 |
| 2015/0324656 A1 | 11/2015 | Marks et al. | |
| 2015/0347812 A1* | 12/2015 | Lin | G06K 9/0012 382/124 |
| 2015/0348269 A1* | 12/2015 | Dedhia | G06K 9/00268 382/197 |
| 2016/0093034 A1* | 3/2016 | Beck | G06T 5/50 345/617 |
| 2016/0140390 A1* | 5/2016 | Ghosh | G06K 9/00597 348/78 |
| 2016/0161332 A1 | 6/2016 | Townsend | |
| 2016/0196653 A1* | 7/2016 | Grant | H04N 5/33 382/294 |
| 2016/0212411 A1 | 7/2016 | Lindner et al. | |
| 2016/0279516 A1* | 9/2016 | Gupta | A63F 13/5255 |
| 2017/0006226 A1* | 1/2017 | Chino | H04N 5/23245 |
| 2017/0061663 A1* | 3/2017 | Johnson | G06T 11/60 |
| 2017/0078591 A1* | 3/2017 | Petrov | H04N 5/332 |
| 2017/0180683 A1* | 6/2017 | Won | H04N 9/67 |
| 2018/0069996 A1* | 3/2018 | Shukla | H04N 5/2258 |
| 2018/0115705 A1* | 4/2018 | Olsson | G06T 5/50 |
| 2018/0115752 A1* | 4/2018 | Sato | H04N 9/07 |
| 2018/0227509 A1* | 8/2018 | Huang | G06T 5/50 |
| 2018/0309940 A1* | 10/2018 | Okada | G06T 5/007 |
| 2018/0330160 A1* | 11/2018 | Yamamoto | H04N 5/232 |
| 2018/0332207 A1* | 11/2018 | Yamamoto | H04N 5/225 |
| 2018/0332209 A1* | 11/2018 | Kojima | H04N 5/225 |
| 2018/0357520 A1* | 12/2018 | Edwards | G06K 9/78 |

OTHER PUBLICATIONS

"International Search Report and Written Opinion Issued in PCT Application No. PCT/US2017/053148", dated Dec. 6, 2017, 13 Pages.

* cited by examiner

RECOLORIZATION OF INFRARED IMAGE STREAMS

BACKGROUND

The present aspects relate to a computer device, and more particularly, to image and video capture in low light conditions.

Photography, video capture, and preview in low light conditions with red green blue (RGB) sensors demand a high amount of analog and digital gain to render colors correctly which has the side effect of visibly corrupting with noise the image. In low light conditions, it may not be possible to retrieve enough photons to correctly render the colors of the elements in the scene in the amount of time restrained by the image capture context (i.e., framerate, scene movement, and camera movement). One option for trying to compensate for image capture in low light conditions is using an additional light source in the visible spectrum of light (i.e., light-emitting diode (LED) or Xenon flash) to illuminate the scene enough so that the RGB sensor can capture enough light to render the scene with correct colors. Using additional visible light sources compromises the intent of capturing the scene in its original state.

Another option for trying to compensate for image capture in low light conditions is using a camera sensor outside of the visible spectrum (i.e., infrared (IR)) with a corresponding light source (i.e., in the IR spectrum) to illuminate and capture the scene without altering the scene in the visible spectrum of light. Images captured in the IR spectrum are usually rendered as monochrome (gray tone) images, without colors, making it hard to identify and convey the information of the scene as they are in the visible spectrum of light.

Yet another option for trying to compensate for image capture in low light conditions includes using a long exposure time to capture enough photons to render appropriately with colors the scene using a RGB sensor. During a long exposure time, objects in the scene may move or the camera itself might move resulting in blur in the capture and the scene not being rendered as the scene was at the moment the intent of capture was executed. Moreover, a capture stream may enforce certain characteristics to be respected that make the use of long exposure time impossible, such as framerate (i.e., video recording at 30 frames per second).

Another option for trying to compensate for image capture in low light conditions includes using specialized hardware to enhance light sensitivity of RGB camera systems, such as bigger pixels, larger aperture, a larger sensor, and/or a different color array instead of the traditional RGB Bayer filters on the sensor (e.g., Red-Green-Blue-White). Specialized RGB camera systems generally cost more to produce and come with compromises in terms of image quality in a regular context where plenty of light is available (i.e., lens flare, fish eye distortion, shallow field of view, cumbersome size, and higher thermal design power).

Thus, there is a need in the art for improvements in image and video capture in low light conditions.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, and an operating system in communication with the memory and processor. The operating system may be operable to receive an infrared (IR) image stream of a scene, detect at least one object in the IR image stream, receive, from a red green blue (RGB) knowledge base, a RGB texture corresponding to the at least one object detected in the IR image stream, process the RGB texture by matching coordinates in the RGB texture with corresponding coordinates in the at least one object to produce a colorized IR image stream, and transmit the colorized IR image stream of the scene wherein the at least one object is displayed in color based on the processing.

Another example implementation relates to method for colorizing an infrared image stream. The method may include receiving, at an operating system executing on the computer device, an infrared (IR) image stream of a scene. The method may also include detecting, by the operating system, at least one object in the IR image stream. The method may include receiving, from a red green blue (RGB) knowledge base, a RGB texture corresponding to the at least one object detected in the IR image stream. The method may also include processing the RGB texture by matching coordinates in the RGB texture with corresponding coordinates in the at least one object to produce a colorized IR image stream. The method may also include transmitting the colorized IR image stream of the scene wherein the at least one object is displayed in color based on the processing.

Another example implementation relates to computer-readable medium storing instructions executable by a computer device. The computer-readable medium may include at least one instruction for causing the computer device to receive an infrared (IR) image stream of a scene. The computer-readable medium may include at least one instruction for causing the computer device to detect at least one object in the IR image stream. The computer-readable medium may include at least one instruction for causing the computer to receive, from a red green blue (RGB) knowledge base, a RGB texture corresponding to the at least one object detected in the IR image stream. The computer-readable medium may include at least one instruction for causing the computer to process the RGB texture by matching coordinates in the RGB texture with corresponding coordinates in the at least one object to produce a colorized IR image stream. The computer-readable medium may include at least one instruction for causing the computer device to transmit the colorized IR image stream of the scene wherein the at least one object is displayed in color based on the processing.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides an image display system for leveraging the infrared light spectrum in contexts where traditional RGB sensors that work in the visible light spectrum cannot function properly due to the lighting not being sufficient. Generally in low light situations, a traditional RGB sensor boosts its analog gain, which corrupts an image of a scene with shot noise and/or extends the exposure time beyond the imposed limit of the framerate to collect enough light. The present disclosure uses an infrared camera and an infrared light source to sufficiently illuminate a scene so that elements can be recognized from the stream data. By using an infrared camera assisted by an infrared light source, a user will not notice the additional light illuminating the scene because the additional light is outside the visible light spectrum. Because enough IR light is collected, the IR sensor does not need to boost analog gain or extend an exposure as much as in other solutions, leading to a clear, clean, and mostly monochrome IR image.

Further, the disclosed system uses image-based identification methods to understand the scene from the IR image stream. The disclosed system identifies elements in the scene and blends the IR intensity (pixel value) of the identified elements in the scene with a known RGB textural representation (pixel value) of these elements. The known RGB textural representation of the identified elements may be accessed from a knowledge base of RGB images. By combining an IR sensor and IR light source with the knowledge base of the RGB aspect (textures) of identified elements in the scene, the IR image stream may be recolorized either partially or completely with RGB color components and produce RGB images of identified elements outside of the visible spectrum of light. As such, for instance in some implementations of image acquisition in low light conditions where RGB sensors would not operate well or at all, the disclosed system is operable to present an image of a scene based on an IR image stream where identified elements are colorized based on known RGB textural representations so that the identified elements are presented as if they are in a normal (i.e., daylight) or well-lit lighting condition. The disclosed system may be used with any photo, video and/or messaging application, such as, but not limited to, Skype, Facebook, Google Hangouts, and Snapchat. Moreover, the disclosed system may be used with any photo or video capture in low light situation and/or pitch dark situations, such as, but not limited to, video communication at night, security monitoring, and manufacturing line supervision.

Figure 1:
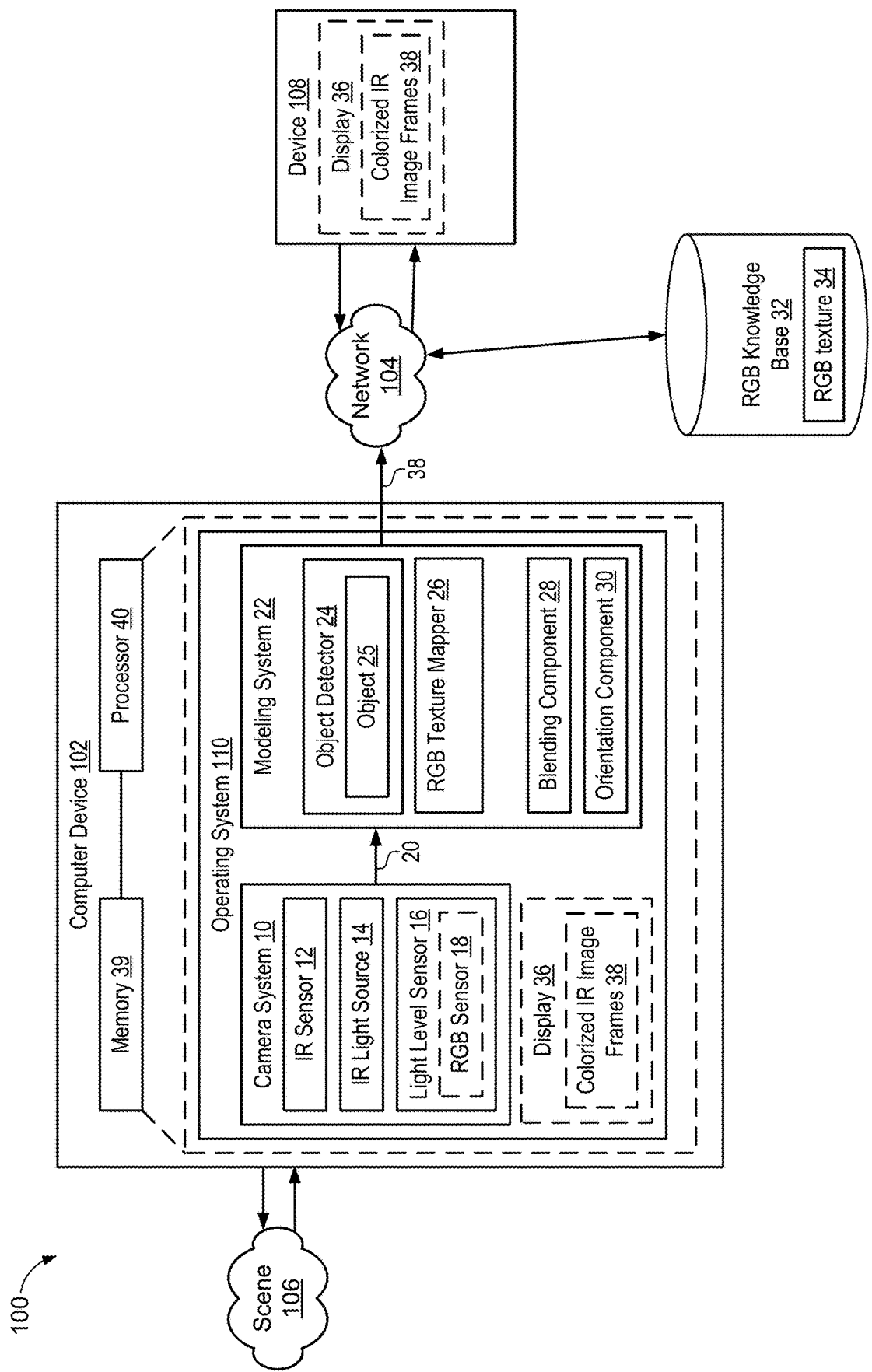
FIG. 1 is a schematic block diagram of an example device in accordance with an implementation of the present disclosure.

Referring now to FIG. 1, an example system 100 for generating a colorized IR image stream of a scene 106 may include a computer device 102 that captures scene 106 via a camera system 10 and produces one or more colorized infrared (IR) image frames 38 that colorize identified elements within scene 106. Camera system 10 may capture a video and/or still picture of scene 106 and may present the one or more colorized infrared (IR) image frames 38 of captured scene 106 on a display 36. Display 36 may be located on computer device 102 and/or on one or more other devices 108 in communication (i.e., via data or video stream, or via one or more messages) with communication device 102 over a wired and/or wireless network 104.

Computer device 102 in accordance with the present disclosure may include an operating system 110 executed by processor 40 and/or memory 39 of computer device 102, and including a camera system 10 for obtaining IR image information and a modeling system 22 for detecting and colorizing objects 25 within the IR image of scene 106. Memory 39 may be configured for storing data and/or computer-executable instructions defining and/or associated with operating system 110, and processor 40 may execute operating system 110. An example of memory 39 can include, but is not limited to, a type of memory usable by a computer, such as random access memory (RAM), read only memory (ROM), tapes, magnetic discs, optical discs, volatile memory, non-volatile memory, and any combination thereof. An example of processor 40 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network 104. Computer device 102 may be, for example, a computer device such as a desktop or laptop or tablet computer, a cellular telephone, a gaming device, a music device, a television, a navigation system, a camera, a personal digital assistant (PDA), or a handheld device, or any other computer device having wired and/or wireless connection capability with one or more other devices.

Camera system 10 may include an IR sensor 12, an IR light source 14, and a light level sensor 16. IR sensor 12 may capture scene 106 in the IR light spectrum. IR sensor 12 includes any type of sensor capable of detecting light in the IR spectrum. IR light source 14 includes any type of lighting device capable of generating light in the IR spectrum. Example camera systems 10 with an IR sensor 12 may include, but are not limited to, digital cameras, video cameras, camcorders, security systems, gaming devices, and cameras on cellular phones, desktops, and tablets. In addition, camera system 10 may optionally include an RGB sensor 18 configured to capture scene 106 in color. RGB sensor 18 includes any type of sensor capable of detecting light in the visible light spectrum. As such, in some cases, camera system 10 may include both IR sensor 12 and RGB sensor 18.

Optionally, camera system 10 may include a light level sensor 16 for activating image capture using IR sensor 12. For instance, in one example implementation, light level sensor 16 may detect a light level in scene 106 and determine whether scene 106 has enough light for image capture using RGB sensor 18. For example, light level sensor 16 may determine whether the light level is below a threshold value. The threshold value may be a low light level, for example, where RGB sensor 18 cannot capture scene 106 and/or where RGB sensor 18 may have difficulty capturing scene 106 with correct colors. In low light conditions, the image captured by RGB sensors 18 may be too dark to be used because there is not enough light collected to render the scene with correct colors. For example, when users of computer device 102 execute a video conference application in low light situations, e.g., at night and/or in rooms with low light, the video displayed during the video conference may be grainy and/or elements in the video may be difficult to view. Moreover, when camera system 10 captures video or photographs in low light situations and/or in pitch dark conditions (e.g., security cameras, manufacturing lines, video communications, photographs at night, etc.), the images may be too dark to be used because not enough light is collected for capturing scene 106 correctly.

When light level sensor 16 determines that the light level in scene 106 is below the threshold value, camera system 10 may use IR sensor 12 to capture scene 106. In addition, camera system 10 may use IR light source 14 to illuminate scene 106 using IR light outside of the visible spectrum to provide additional light to assist IR sensor 12 in capturing scene 106. For example, IR light source 14 may illuminate objects in scene 106 that are in proximity to IR light source 14 and/or IR sensor 12. By using IR light outside the visible light spectrum to illuminate scene 106, scene 106 may be illuminated without affecting the visible perception of a user. Because IR light source 14 provides additional light to scene 106, IR sensor 12 may generate a clear and clean IR image stream 20, i.e., one or more sets of image data in one or more frames that define an image 20, of scene 106. For example, IR image stream 20 may be a single channel gray image.

Camera system 10 may communicate IR image stream 20 to modeling system 22. Modeling system 22 may include an object detector 24 configured to identify one or more objects 25 in IR image stream 20. Objects 25 may include moving and stationary elements in scene 106, such as but not limited to, humans, animals, geographical features and/or landmarks, books, furniture, decorations, plants, etc. Object detector 24 may use image-based identification methods to identify one or more objects 25 in IR image stream 20. For example, but not limited hereto, object detector 24 may use facial recognition systems to detect one or more faces in IR image stream 20. In some implementations, object detector 24 may communicate the identified objects 25 to orientation component 30.

Orientation component 30 may estimate the orientation and/or pose of objects 25 in IR image stream 20. For example, objects 25 may be animated elements in scene 106 (e.g., individuals talking or moving around scene 106) and/or objects 25 may be stationary elements. Orientation component 30 may use a variety of processing to infer the orientation of objects 25. For example, orientation component 30 may apply an active appearance model (AAM) or a decision forest to estimate the three dimension (3D) orientation and scale of objects 25. Orientation component 30 may communicate the inferred orientation of objects 25 to RGB texture mapper 26.

RGB texture mapper 26 may identify corresponding RGB textures 34 for objects 25 identified in IR image stream 20. RGB texture mapper 26 may retrieve RGB textures 34 from an RGB knowledge base 32 communicatively coupled to computer device 102. RGB textures 34 may include one or more pixels having color values. For example, RGB textures 34 may include images of objects 25. RGB knowledge base 32 may be a database of images collected from a variety of resources. For example, users of computer device 102, or any other device 108, may add images to RGB knowledge base 32. In addition, RGB knowledge base 32 may be a self-learning knowledge base of images, where the images include one or more images captured from one or more applications (i.e., photo, video, etc.) executing on computer device 102. For example, RGB knowledge base 32 may receive images in connection with authenticating user accounts on computer device 102. As such, as images are inputted into RGB knowledge base 32, RGB knowledge base 32 may associate an identification with the images from additional information received with the images, and/or based on user input. RGB knowledge base 32 may be trained and/or refined as more images are received by RGB knowledge base 32. RGB knowledge base 32 may be stored on computer device 102 and/or may be stored on other devices accessible by computer device 102 via network 104, such as a server.

In an implementation, RGB texture mapper 26 may transmit an identification of object 25 to RGB knowledge base 32. RGB knowledge base 32 may access a RGB texture 34 corresponding to the received identification and the provide RGB texture 34 to RGB texture mapper 26. In another implementation, RGB texture mapper 26 may transmit an image of object 25 to RGB knowledge base 32. RGB knowledge base 32 may access a RGB texture 34 corresponding to the image and provide the RGB texture 34 to RGB texture mapper 26.

In addition, RGB texture mapper 26 may fit RGB textures 34 onto the identified IR objects 25. In some implementations, for instance based on an estimated pose of IR objects 25, RGB texture mapper 26 may register coordinates in the RGB texture 34 with corresponding coordinates of object 25 to overlay the RGB textures 34 on top of object 25. For example, RGB texture mapper 26 may identify face landmark coordinates in object 25 and match and/or shape RGB texture 34 onto object 25 so that object 25 includes RGB texture 34 over the IR image of object 25.

Also, in some optional implementations, after RGB texture 34 is mapped to object 25, blending component 28 may blend the color intensities of RGB texture 34 with the IR color image of object 25 to provide a color representation of object 25 based on the IR lighting conditions of scene 106. Blending component 28 may normalize RGB texture 34 by preprocessing RGB texture 34 to provide an even distribution of color over features in RGB textures 34. For example, if RGB texture 34 is an image taken in the sunlight, there may be shadows on the object captured in the image that may need to be blended for a uniformly lit RGB texture 34. In addition, blending component 28 may use the IR light source 14 to measure an intensity of light reflected from scene 106, where the intensity may vary depending on shading on the object based on the position of IR light source 14.

Blending component 28 may receive a response from IR sensor 12 with an estimation of the light reflected from scene 106, e.g., the illumination of scene 106 provided by IR light source 14. Blending component 28 may measure the intensity of the IR light on the scene relative to the position of object 25 to IR sensor to estimate an intensity of light for object 25. In addition, blending component 28 may convert the RGB information from RGB texture 34 to YUV color space and map the Y channel accordingly with the pixel intensity of the (monochrome) IR feed. For example, the Y channel (byte range 0-256) of RGB texture 34 may be modulated by the normalized pixel intensity in IR (range in floating point from 0 to 1) so that Y channel of the reference texture*IR pixel intensity=a final Y value in the recolorized frame for the matched pixel.

RGB texture mapper 26 and/or blending component 28 may generate colorized image frames and/or colorized image stream 38 based on mapping and/or blending the color intensities of RGB texture 34 with the IR color image of object 25. Colorized image frames 38 may display a colorized image and/or video of scene 106 where the identified objects 25 are colorized while the remaining items in scene 106 are gray.

Modeling system 22 may transmit colorized image frames 38 to display 36. Display 36 may be on computer device 102. In addition, display 36 may be on one or more devices 108 in communication with computer device 102 via network 104. The registration and blending of the RGB textures 34 with the objects 25 in IR image stream 20 may occur in real time or near real time. As such, when objects 25 move in scene 106, the registration and blending of the RGB textures 34 may occur as the position of objects 25 changes and colorized image frames 38 may be presented on display 36 in real time or near real time.

Figure 2:
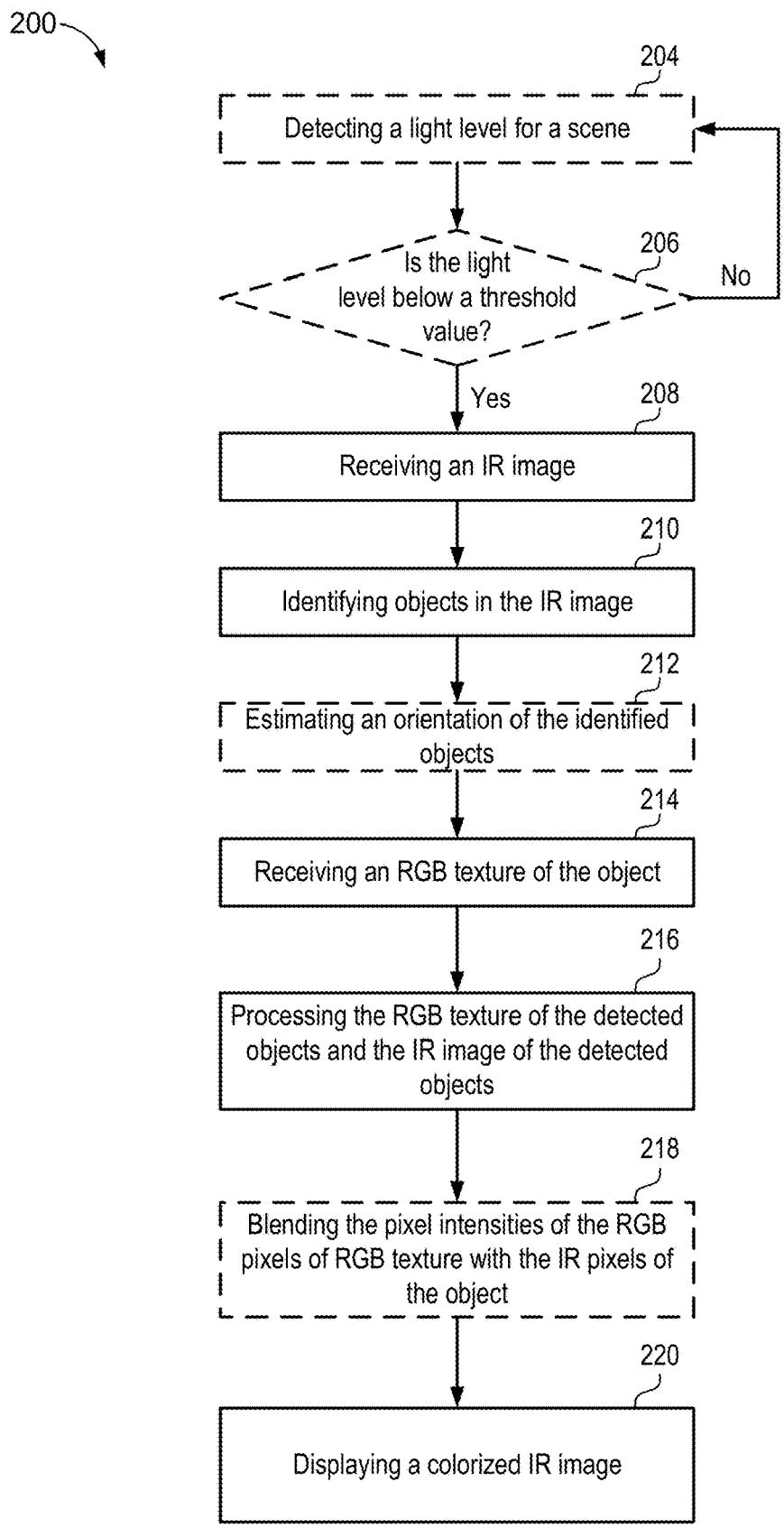
FIG. 2 is a flow chart of a method for recolorization of an IR image stream in accordance with an implementation of the present disclosure.
Figure 3:
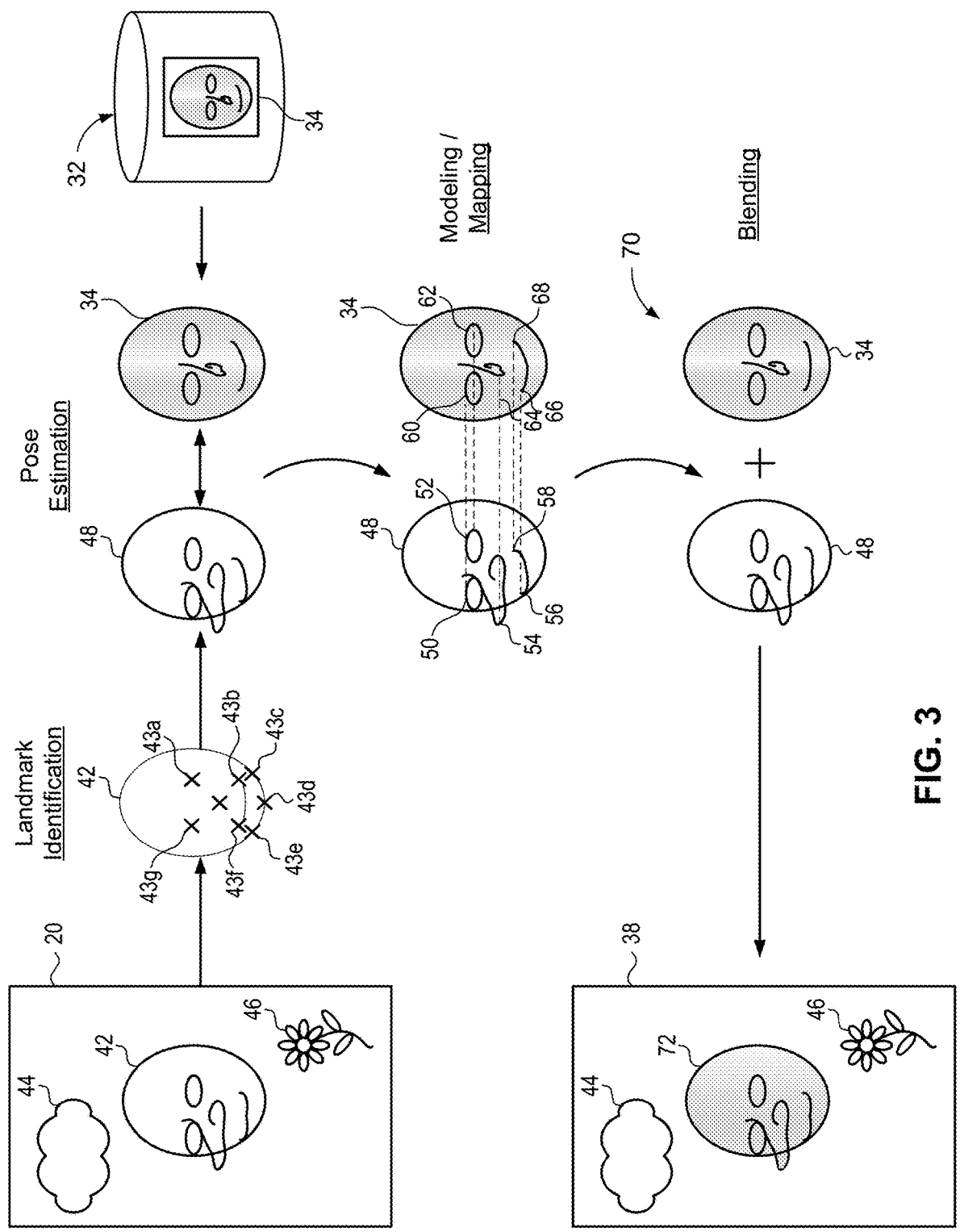
FIG. 3 is a schematic diagram of an example method for recolorization of an IR image stream in accordance with an implementation of the present disclosure.

Referring now to FIGS. 2 and 3, an example method 200 for colorizing one or more identified objects in an IR image stream of image data may be executed by operating system 110 (FIG. 1) on computer device 102 (FIG. 1), for example, in low lighting conditions for image or video capture of scene 106 (FIG. 1).

Optionally (as indicated by dashed lines), at 202 and 206, method 200 may include detecting a light level for a scene and determining whether the light level is below a threshold value. Light level sensor 16 (FIG. 1) may detect a light level for scene 106 and determine whether the light level is below a threshold value. The threshold value may include, for example, a level of light where RGB sensor 18 (FIG. 1) cannot capture scene 106 and/or RGB sensor 18 may have difficulty capturing scene 106. When the level of light is below the threshold value, the resulting image or video may be too dark to identify objects present in scene 106.

At 208, method 200 may include receiving an IR image. For example, modeling system 22 (FIG. 1) may receive IR image stream 20 (FIG. 1) from IR sensor 12 (FIG. 1), which, in some optional implementations, may be in response to when the light level is below a threshold value. IR image stream 20 may represent scene 106 as illuminated by IR light source 14, as IR sensor 12 captures IR light reflected off of scene 106 and captured in one or more sets of data that define IR image stream 20 of scene 106. For example, as illustrated in FIG. 3, modeling system 22 (FIG. 1) may receive IR image stream 20, which includes data and/or pixel intensities representing a plurality of objects 44, 42, 46 in scene 106. In addition, IR image stream 20 may include gyro data to help reorient an image, if necessary, before operating the detection of objects using the image. IR image steam 20 may also include metadata about a camera state, such as exposure time, ISO speed, IR light source intensity, focus position (a fixed focus camera may be preferable), and any other camera driver metadata that could be used to infer detection with a given image (i.e., some drivers can send a histogram along the image, even a rough region of interest (ROI) to locate the face or other objects). In an implementationspec, modeling system 22 may receive IR image stream 20 in response to user input. For example, a user of computer device 102 may select for IR sensor 12 to capture scene 106 regardless of whether the level of light is below the threshold value.

At 210, method 200 may include identifying objects in the IR image stream 210. For instance, in one non-limiting case, object detector 24 (FIG. 1) may use image processing methods to identify face 42 in IR image stream 20. For example, object detector may use an IR sensor 12 to detect objects 44, 42, and 46 (FIG. 3) in IR image stream 20. Object detector 24 may identify one or more objects, for example, detected face 42 of a particular individual and extract a mean texture of face 42. In this above-mentioned example, object detector 24 may extract a mean texture of face 42 by using, for example, face identification in a set of photos to retrieve faces associated to a particular person. Object detector 24 may also align the set of faces using facial landmark descriptors and compute the mean aspect of the detected face 42.

At 212, optionally (as indicated by dashed lines), method 200 may include estimating an orientation of the identified objects 212. Orientation component 30 may use landmarks on the identified objects to estimate a pose of the objects, as well as a scale and three dimensional orientation of the objects. For example, orientation component 30 may detect facial landmarks 43a-43g (FIG. 3) on face 42. The detected facial landmarks 43a-43g may be used to generate an estimated position 48 of detected face 42. For example, orientation component 30 may use an Active Appearance Model (AAM), a decision forest algorithms or a Deep Neural Network (DNN) to infer the scale and orientation of facial landmarks 43a-43g.

At 214, method 200 may include receiving an RGB texture of the detected object 214. For example, RGB texture mapper 26 may access a RGB knowledge base 32 with a data store of RGB images. RGB knowledge base 32 may be populated with images by a user of computer device 102 (FIG. 1), from applications executed on computer device 102, or other information sources, such as other devices 108. For example, RGB knowledge base 32 may include images received during an authentication process for a user account. RGB knowledge base 32 may include images along with and an associated identification of the images. For example, RGB texture mapper 26 may access a RGB knowledge base 32 for a RGB texture 34 of detected face 42. In this limited example, RGB texture 34 may be an image of detected face 42. RGB texture mapper 26 may transmit an identifier associated with the image of detected face 42 and may receive the RGB texture 34 corresponding to the identifier from RGB knowledge base 32. In another example, RGB texture mapper 26 may transmit the image of detected face 42 to RGB knowledge base 32 and may receive a RGB texture 34 that matches the image of detected face 42.

At 216, method 200 may include processing the RGB texture of the detected objects and the IR image of the detected objects. RGB texture mapper 26 may match coordinates in RGB texture 34 with corresponding coordinates in the at least one detected face 42 to produce a colorized IR image frames and/or colorized IR image stream 38. For example, RGB texture mapper 26 may take the estimated orientation 48 of detected face 42 and match coordinates 60, 62, 64, 66, and 68 from RGB texture 34 with respective coordinates 50, 52, 54, 56, and 58 from the estimated orientation 48 of detected face 42. Thus, RGB texture mapper 26 may use the identified coordinates to register RGB texture 34 by overlaying RGB texture 34 on the IR image 48.

At 218, optionally (as indicated by dashed lines), method 200 may include blending the pixel intensities of the RGB pixels of RGB texture with the IR pixels of the object. Blending component 28 (FIG. 1) may compose colorized image frames 38 by blending the pixels values from the facial areas in the IR image stream 48 and the corresponding RGB pixel values from RGB texture 34 (FIG. 3, 70). Blending component 28 may normalize RGB texture 34 by preprocessing RGB texture 34 to provide an even distribution of color over features in RGB textures 34. For example, if RGB texture 34 is an image taken in bright light, there may be shadows on the individual captured in the image that may need to be blended for a uniformly lit RGB texture 34. In addition, blending component 28 may use IR light source 14 to measure an intensity of light on scene 106. Blending component 28 may receive a response from IR sensor 12 with an estimation of the illumination provided by IR light source 14, i.e., the reflected IR light captured by IR sensor 12. Blending component 28 may estimate the intensity of the IR light on the scene by measuring the intensity of IR light relative to the position of object 48 in relation to IR sensor 12. Blending component 28 may use the estimation of the illumination when blending the pixel intensities. Blending component 28 may also use the mean texture of face 48 extracted, for example, using facial landmark and face pose when blending the pixel values to generate colorized image frames 38. For example, blending component 28 may convert the RGB information from RGB texture 34 to YUV space and map the Y channel accordingly with the pixel intensity of the (monochrome) IR feed. For example, the Y channel (byte range 0-256) of RGB texture 34 may be modulated by the normalized pixel intensity in IR (range in floating point from 0 to 1) so that Y channel of the reference texture*IR pixel intensity=a final Y value in the recolorized frame for the matched pixel.

At 220, method 200 may include displaying a colorized IR image. In an example, operating system 110 and/or modeling system 22 may generate colorized image frames 38, e.g., either based on the operation of RGB texture mapper 26 matching RGB texture 34 with a detected object, and/or based on the operation of blending component 28 using the measured IR intensity to shade the detected object. For example, colorized image frames 38 may be presented on display 36 (FIG. 1). Colorized image frames 38 may include a color image 72 of the detected face 42 with objects 44 and 46 displaying as gray monochrome images. Because object detector 24 did not identify objects 44 and 46 in scene 106, objects 44 and 46 are not colorized and remain gray. Display 36 may be on computer device 102 and/or on a different device in communication with computer device 102. For example, if a user of computer device 102 is in a video conference with another user of a device, colorized image frames 38 may be displayed on a display 36 of both computer device 102 and a display 36 of the other device.

Figure 4:
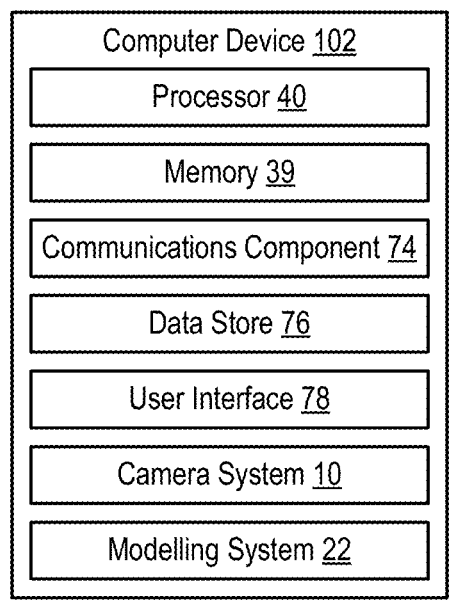
FIG. 4 is a schematic block diagram of an example device in accordance with an implementation of the present disclosure.

Referring now to FIG. 4, illustrated is an example computer device 102 in accordance with an implementation, including additional component details as compared to FIG. 1. In one example, computer device 102 may include processor 40 for carrying out processing functions associated with one or more components and functions described herein. Processor 40 can include a single or multiple set of processors or multi-core processors. Moreover, processor 40 can be implemented as an integrated processing system and/or a distributed processing system.

Computer device 102 may further include memory 39, such as for storing local versions of applications being executed by processor 40. Memory 39 can include a type of memory usable by a computer, such as random access memory (RAM), read only memory (ROM), tapes, magnetic discs, optical discs, volatile memory, non-volatile memory, and any combination thereof. Additionally, processor 40 and memory 39 may include and execute operating system 110 (FIG. 1).

Further, computer device 102 may include a communications component 74 that provides for establishing and maintaining communications with one or more parties utilizing hardware, software, and services as described herein. Communications component 74 may carry communications between components on computer device 102, as well as between computer device 102 and external devices, such as devices located across a communications network and/or devices serially or locally connected to computer device 102. For example, communications component 74 may include one or more buses, and may further include transmit chain components and receive chain components associated with a transmitter and receiver, respectively, operable for interfacing with external devices.

Additionally, computer device 102 may include a data store 41, which can be any suitable combination of hardware and/or software, that provides for mass storage of information, databases, and programs employed in connection with implementations described herein. For example, data store 76 may be a data repository for camera system 10 (FIG. 1), RGB knowledge base 32 (FIG. 1) and/or modeling system 22 (FIG. 1).

Computer device 102 may also include a user interface component 43 operable to receive inputs from a user of computer device 102 and further operable to generate outputs for presentation to the user. User interface component 43 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 43 may include one or more output devices, including but not limited to a display, a speaker, a haptic feedback mechanism, a printer, any other mechanism capable of presenting an output to a user, or any combination thereof.

Computer device 102 may additionally include camera system 10 (FIG. 1) configured to capture an image and/or video of scene 106 (FIG. 1). In addition, computer device 102 may include modeling system 22 configured to recolorize an IR image. In an implementation, user interface component 43 may transmit and/or receive messages corresponding to the operation of camera system 10 and/or modeling system 22. In addition, processor 40 executes camera system 10 and/or modeling system 22, and memory 39 or data store 76 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various implementations are described herein in connection with a device (e.g., computer device 102), which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computer device, or other processing devices connected to a wireless modem.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
   a memory to store data and instructions;
   a processor in communication with the memory; and
   an operating system in communication with the memory and the processor, wherein the operating system is operable to:
   receive an infrared (IR) Image stream of a scene, illuminated by an IR light source, including IR pixel intensities;
   detect at least one object in the IR image stream and corresponding ones of the IR pixel intensities;
   receive, from a red green blue (RGB) knowledge base, a RGB texture Including RGB pixel intensities corresponding to the at least one object detected in the IR image stream;
   process the RGB texture by matching coordinates in the RGB texture with corresponding coordinates in the at least one object to produce a colorized IR image stream by blending the RGB pixel intensities from the RGB texture with the corresponding ones of the IR pixel intensities of the at least one object by using an estimation of IR light provided by the IR light source to determine a final color value for the RGB texture in the colorized IR stream; and
   transmit the colorized IR image stream of the scene wherein the at least one object is displayed in color based on the processing.

2. The computer device of claim 1, wherein the operating system is further operable to:
   detect a light level in the scene; and
   receive the IR image stream of the scene in response to the light level being below a threshold level.

3. The computer device of claim 1, wherein the operating system is further operable to estimate an orientation of the at least one object by processing identified landmarks in the at least one object and map the RGB texture to the estimated orientation of the at least one object.

4. The computer device of claim 1, wherein the operating system is further operable to transmit an identifier of the at least one object to the RGB knowledge base and receive the corresponding RGB texture based on the identifier.

5. The computer device of claim 1, wherein the operating system is further operable to preprocess the RGB texture to produce an even color distribution on the RGB texture and to blend the RGB pixel intensities from the RGB texture with the corresponding ones of the IR pixel intensities of the at least one object based on the preprocessed RGB texture.

6. The computer device of claim 1, wherein the RGB knowledge base receives images from one or more applications executing on the computer device.

7. The computer device of claim 1, wherein the colorized IR stream displays unidentified objects in gray or monochrome.

8. A method for colorizing an infrared image stream, comprising:
receiving, at an operating system executing on a computer device, an infrared (IR) image stream of a scene, illuminated by an IR light source, including IR pixel intensities;
detecting, by the operating system, at least one object in the IR image stream and corresponding ones of the IR pixel intensities;
receiving, from a red green blue (RGB) knowledge base, a RGB texture including RGB pixel intensities corresponding to the at least one object detected in the IR image stream;
processing the RGB texture by matching coordinates in the RGB texture with corresponding coordinates in the at least one object to produce a colorized IR image stream by blending the RGB pixel intensities from the RGB texture with the corresponding ones of the IR pixel intensities of the at least one object by using an estimation of IR light provided by the IR light source to determine a final color value for the RGB texture in the colorized IR stream; and
transmitting the colorized IR image stream of the scene wherein the at least one object is displayed in color based on the processing.

9. The method of claim 8, further comprising:
detecting a light level in the scene; and
receiving the IR Image stream of the scene in response to the light level being below a threshold level.

10. The method of claim 8, further comprising:
estimating an orientation of the at least one object by processing identified landmarks in the at least one object, and
wherein mapping the RGB texture further comprises mapping the RGB texture to the estimated orientation of the at least one object.

11. The method of claim 8, further comprising:
transmitting an identifier of the at least one object to the RGB knowledge base, and wherein the corresponding RGB texture is received based on the identifier.

12. The method of claim 8, further comprising preprocessing the RGB texture to produce an even color distribution on the RGB texture and wherein blending the RGB pixel intensities from the RGB texture with the corresponding ones of the IR pixel intensities of the at least one object is based on the preprocessed RGB texture.

13. The method of claim 8, wherein the RGB knowledge base receives images from one or more applications executing on the computer device.

14. The method of claim 8, wherein the colorized IR stream displays unidentified objects in gray or monochrome.

15. A non-transitory computer-readable medium storing instructions executable by a computer device, comprising:
at least one instruction for causing the computer device to receive an infrared (IR) image stream of a scene, illuminated by an IR light source, including IR pixel intensities;
at least one instruction for causing the computer device to detect at least one object in the IR image stream and corresponding ones of the IR pixel intensities;
at least one instruction for causing the computer device to receive, from a red green blue (RGB) knowledge base, a RGB texture including RGB pixel intensities corresponding to the at least one object detected in the IR image stream;
at least one instruction for causing the computer device to process the RGB texture by matching coordinates in the RGB texture with corresponding coordinates in the at least one object to produce a colorized IR image stream by blending the RGB pixel intensities from the RGB texture with the corresponding ones of the IR pixel intensities of the at least one object by using an estimation of IR light provided by the IR light source to determine a final color value for the RGB texture in the colorized IR stream; and
at least one instruction for causing the computer device to transmit the colorized IR image stream of the scene wherein the at least one object is displayed in color based on the processing.

16. The computer device of claim 1, wherein the operating system is further operable to multiply a color channel of the RGB texture with the IR pixel intensities of the at least one object to determine the final color value for the RGB texture in the colored IR Image stream.

17. The computer device of claim 1, wherein the operating system is further operable to normalize the RGB texture by providing a uniformly lit RGB texture and use the normalized RGB texture.

* * * * *